(12) United States Patent
Horii et al.

(10) Patent No.: US 8,214,803 B2
(45) Date of Patent: Jul. 3, 2012

(54) PROGRAM TESTING METHOD AND TESTING DEVICE

(75) Inventors: Hiroshi Horii, Yamato (JP); Hisashi Miyashita, Machida (JP); Hideki Tai, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1564 days.

(21) Appl. No.: 11/642,793

(22) Filed: Dec. 20, 2006

(65) Prior Publication Data

US 2007/0198970 A1 Aug. 23, 2007

(30) Foreign Application Priority Data

Dec. 21, 2005 (JP) .................................. 2005-368746

(51) Int. Cl.
*G06F 9/44* (2006.01)

(52) U.S. Cl. ........................ 717/124; 717/126; 717/127

(58) Field of Classification Search ........................ None
See application file for complete search history.

(56) References Cited

U.S. PATENT DOCUMENTS 7,831,962 B2 * 11/2010 Banerjee et al. .............. 717/126

OTHER PUBLICATIONS

Memory dump: Dependency Injection for Unit Tests, Jul. 17, 2004.*
"Memory Dump, Dependency Injection for Unit Tests," (searched on Nov. 28, 2005) (http://jroller.com/page/ara_e/20040717#dependency_injection_for_unit_tests).
"Inversion of Control Containers and the Dependency Injection pattern" by Martin Fowler, (http://www.martinfowler.com/articles/injection.html).

* cited by examiner

*Primary Examiner* — Insun Kang
(74) *Attorney, Agent, or Firm* — William Stock; Anne Vachon Dougherty

(57) ABSTRACT

A testing device for testing a system configured of an application and a set of execution-environment-dependent resources used by the application includes a DI container for injecting one resource set (EUT) into an application for which a test is executed via an application interface, the resource set being a candidate of dependency injection into the application, and a test execution unit that executes a test on the application with the one resource set having been injected therein. When another resource set that is different from the one resource set exists the injection by the DI container and the test by the test execution unit are executed on the other resource set.

20 Claims, 17 Drawing Sheets

FIG. 8
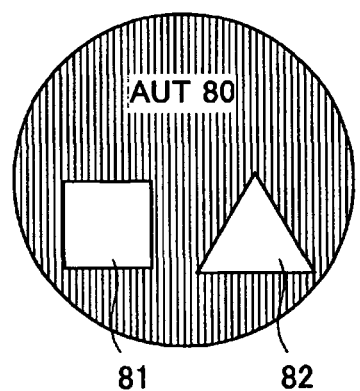
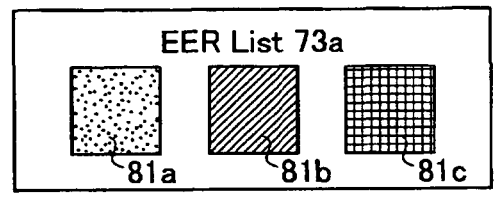
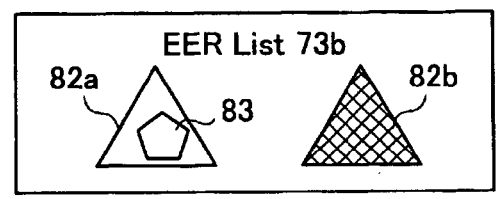
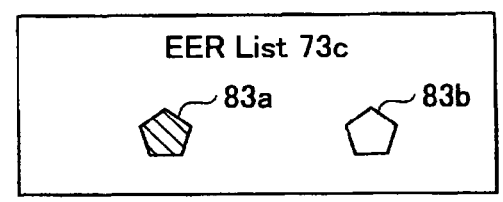

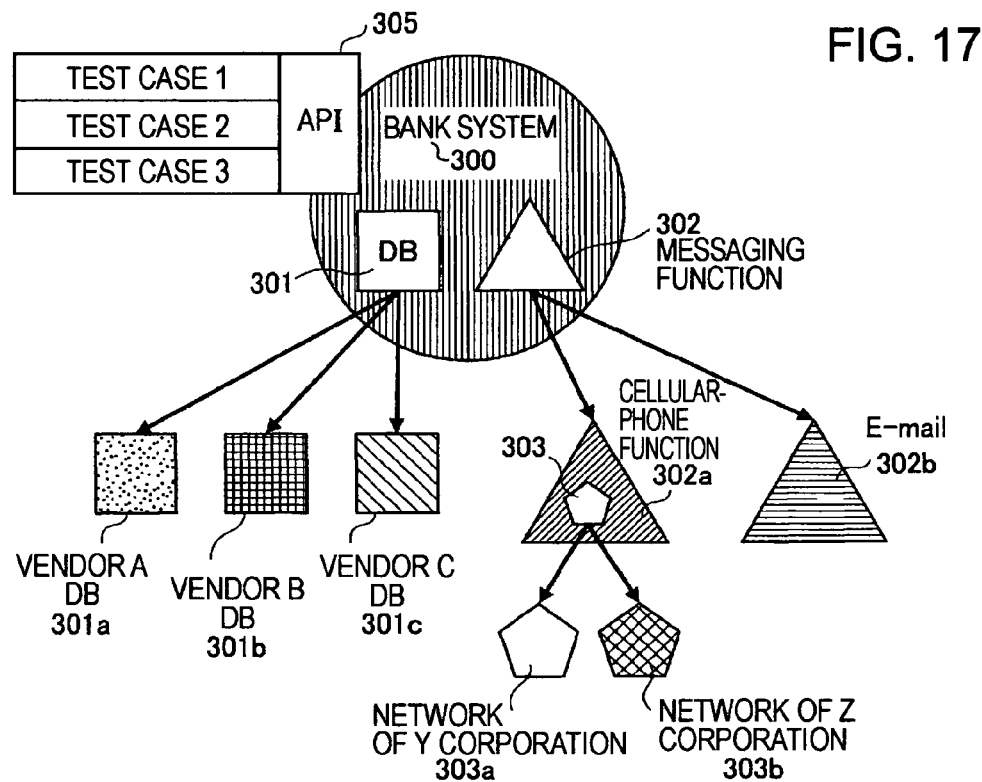
FIG. 17
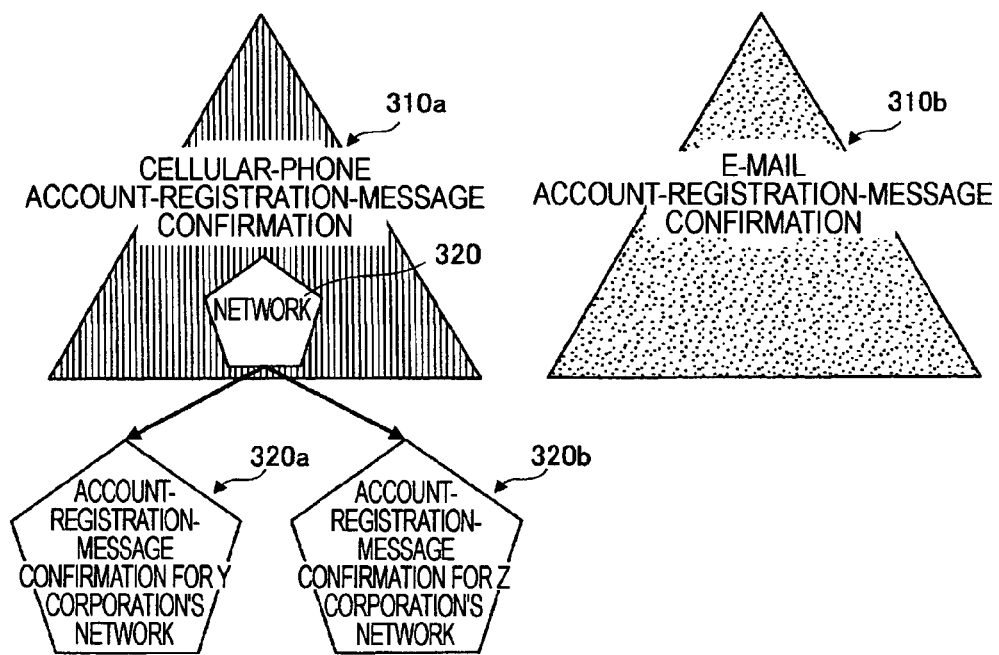

PROGRAM TESTING METHOD AND TESTING DEVICE

FIELD OF THE INVENTION

The present invention relates to program testing methods and testing devices. More specifically, the present invention relates to a method of testing a plurality of programs, a program for executing the method, and a testing device for executing the method.

BACKGROUND OF THE INVENTION

Hitherto, tests have been executed to check whether a system under test in combination with other systems behaves properly in accordance with specifications. Such tests are needed for debugging the system under test and to verify compatibility between systems. Currently, many application programs (hereinafter referred to as "applications") are expected to operate in combination with various systems, so that a test (integration test) must be executed on all the systems that can be combined.

In order to execute an integration test between a system under test and various systems that can be combined therewith, specific dependency settings must be prepared individually for systems under test or systems combined therewith, and test cases must be described individually for systems configured. These tasks require a lot of work, so that an improvement in the efficiency of test execution is desired.

In such an integration test, when an application is executed by a system, in some cases, the logic of the application is executed using resources provided by the system. For example, an application connects to a database, executes personal authentication, and so forth using a database connection class, an authentication mechanism, and so forth provided by the system. When a system such as a database is used, an integration test between the application and the system that executes the application is indispensable. As described above, many applications that use system resources must be written in consideration of the types of resources provided by systems.

For example, a class for connecting to a specific type of database is specified directly in source code or in an application-specific configuration file. In order to ensure that such an application can be executed by various systems, it is needed to rewrite application source code or to make application-specific setting on a system-by-system basis.

In accordance with the increasing interest in the combination of an application and systems used by the application, the concept of dependency injection (DI) has recently been proposed. In system based on DI (DI system), setting in a form called dependency is assigned from outside to combine resources used by the application (the application is also combined using dependency). Dependency refers to a description of resources (destinations) needed by a resource (source). For example, when a resource A requires a resource B, a dependency that "A is dependent on B" is written (A→B). Upon interpreting the dependency, the DI system constructs the resource B, and provides the resource B to the resource A by inserting code, by using a setter method, by specification from a constructor, or the like.

The article entitled "Memory Dump, Dependency Injection for Unit Tests," (searched on Nov. 28, 2005) (http://jroller.com/page/ara_e/20040717#dependency_injection_for_unit_tests) discloses a specific example of using DI in a test system. In the testing method disclosed, unit tests are facilitated by minimizing external dependencies of components based on DI.

According to the above-referenced article, only a method of dependency injection for constructing a unit test system is disclosed, and a testing method or testing system for an integration test of a system in which a plurality of resources (execution environments) is injected is not disclosed.

As described above, through the spread of applications in the form of assets, an increased demand exists for designing and implementing recent applications so that the applications can be executed on various system configurations. For example, applications are implemented so that database connection classes of a plurality of vendors or various forms of authentication mechanisms can be used. In order to ensure by testing that the application can be executed on various system configurations that provide such resources, an integration test must be executed, in which joint tests for the application are executed on all the supported system configurations. However, the above-referenced article does not disclose a method for executing an integration test that covers a plurality of dependency-injected resources.

In order to overcome the problems described above, it is an object of the present invention to provide a method, device, and controlling program for executing an integration test of an application on a plurality of execution environments respectively that are dependency-injected.

SUMMARY OF THE INVENTION

According to an aspect of the present invention, there is provided a method of testing a system configured of an application and a set of execution-environment-dependent resources used by the application, the method including a step of injecting at least one set of execution-environment-dependent resources (EUTs) into an application (AUT) for which a test is executed via an application interface, the at least one set of execution-environment-dependent resources being a candidate of dependency injection into the application and used by the application; and a step of executing a test on the application with the at least one set of execution-environment-dependent resources used by the application having been injected therein.

According to another aspect of the present invention, there is provided a method of testing a system configured of an application and a set of execution-environment-dependent resources used by the application, the method including a step of generating one or more sets of resources (EUTs) that serve as candidates of dependency injection into an application for which a test is executed via an application interface; a step of injecting one set of resources into the application among the one or more sets of resources generated in the generating step; a step of executing a test on the application with the one set of resources having been injected therein; and a step of repeating the injecting step and the test execution step on another set of resources, if any exists, that is different from the one set of resources.

According to the present invention, when an application needs testing in a plurality of execution environments, using dependency injection of a resource set, one resource set that is a candidate of dependency injection into the application is injected into the application, and a test is executed on the application with the one resource set having been injected therein. The injecting step and the test execution step are repeated on another set of resources if any exists, thereby executing an integration test for a plurality of resource sets.

Advantages

According to the present invention, a method, system, and controlling program for executing an integration test of an application on a plurality of execution environments that are dependency-injected can be provided, by dependency-injecting execution environments into an application that requires testing in a plurality of execution environments.

BRIEF DESCRIPTION OF THE FIGURES

FIG. 8 is a diagram schematically showing an EER list.

FIG. 17 is a diagram schematically showing application of the embodiment to a bank system.

DETAILED DESCRIPTION OF THE INVENTION

Figure 1:
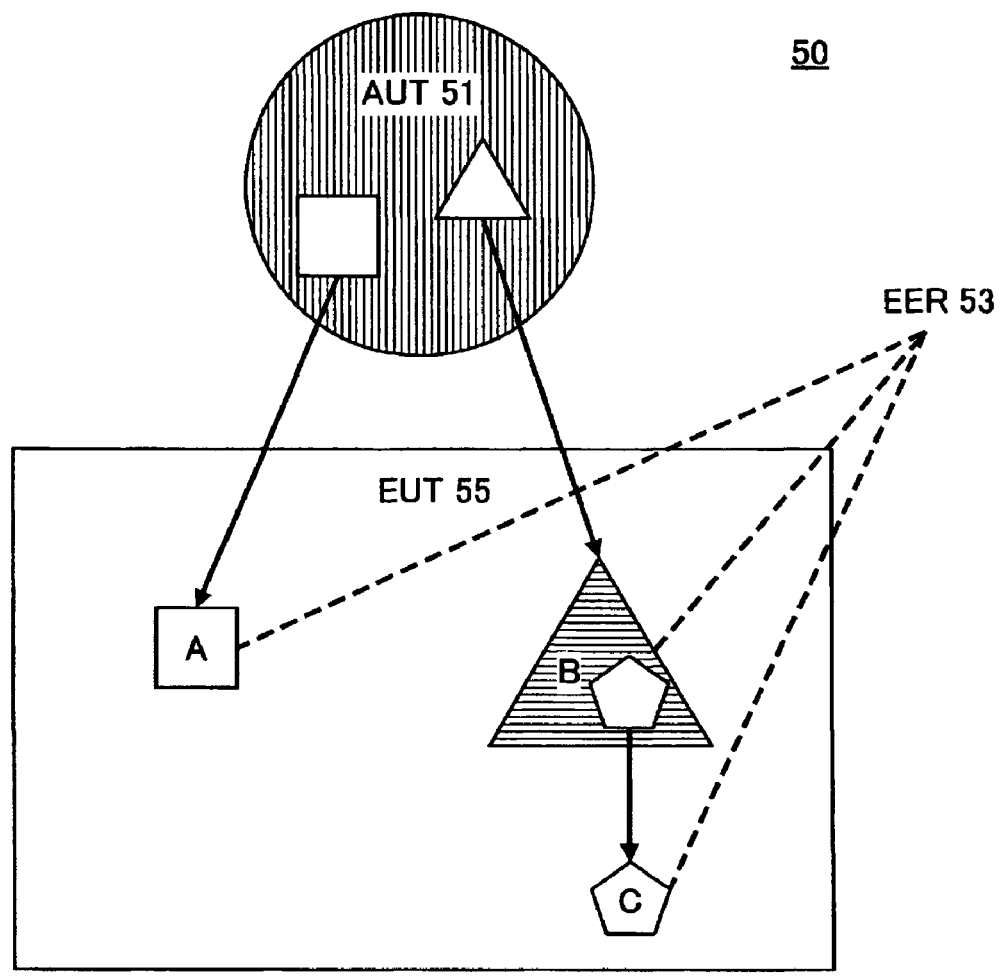
FIG. 1 is a diagram showing a system 50 implemented by a computer program under test according to a preferred embodiment of the present invention.

FIG. 1 shows a system 50 implemented by a computer program under test according to an embodiment of the present invention. The system 50 includes an application 51 that is tested (hereinafter referred to as an "AUT") and an execution environment 55 that is dependency-injected into the AUT 51 (hereinafter referred to as an "EUT").

The AUT (Application Under Test) 51 is an application program (hereinafter referred to as an "application") or a system on which an application program runs, which is under an integration test. In the system implemented by the computer program, an application is executed via an application interface. In this specification, an application that is tested will be referred to as an AUT.

An application is executed by dependency-injecting one or more execution-environment modules (hereinafter referred to as "EERs") in the EUT 55 into the application. Similarly, the AUT 51 is executed by dependency-injecting one or more execution-environment modules in the EUT 55 into the AUT 51. That is, the AUT 51 can be executed by combining it with one or more EERs provided by the EUT 55 via a DI container described later.

The EUT (Execution Environment Under Test) 55 is an execution environment that is injected into an application in the system implemented by the computer program, and it is an environment program or system for execution of the application. The EUT 55 includes a plurality of EERs, such as EERs 53. When an application is executed, an execution environment constituted by the EERs 53 is injected into the application. More specifically, the execution environment injected into the application herein refers to one or more execution-environment-dependent resources used by the application, and it refers to a set of resources when a plurality of resources is injected. Thus, when the AUT 51 is tested, the EERs 53 constituting the EUT 55 are dependency-injected into the AUT 51 via a DI container and then a test is executed. The DI container refers to a device or function that resolves dependency on the basis of link information such as that contained in a dependency description file described later.

The EERs (Execution Environment Resources) 53 are execution-environment modules (corresponding to the resources described above) included in the EUT 55. For example, when an application is executed by injecting a DriverManager, a DriverManager of a vendor A is dependency-injected as an execution-environment module. Thus, when the AUT 51 is executed, for example, the DriverManager of the vendor A, indicated as an EER A among the EERs 53, is dependency-injected as an execution-environment module. The "DriverManager" described herein as an example refers to an instance for database connection, and it is the name of a class in the Java® JDBC database access library.

It is possible to dependency-inject other EERs into an EER. For example, as indicated by B and C in FIG. 1, an EER C among the EERs 53 is dependency-injected into an EER B among the EERs 53, and the EER B with the EER C having been injected therein is injected into the AUT 51. In this case, when an application is executed, an execution-environment module is dependency-injected into another execution-environment module, and the execution-environment module obtained by the dependency injection is further dependency-injected into the application.

Dependency injection refers to techniques of storing link information regarding linking of resources used by an application and resolving dependencies using the link information. Dependency injection is described in detail, for example, in "Inversion of Control Containers and the Dependency Injection pattern" on Martin Fowler's web site at http://www.martinfowler.com/articles/injection.html. When an application is dependency-injected, the dependencies are resolved by a DI container. An advantage of using dependency injection is that the method of linking an application and an execution environment provided by a system can all be written generally in the form of a dependency description. Furthermore, since a DI container can resolve dependencies on the basis of the dependency description or results of resource analysis by the DI container itself and select and manage resources that are dependency-injected into the application, the DI container can manage the configuration of an application.

Figure 2:
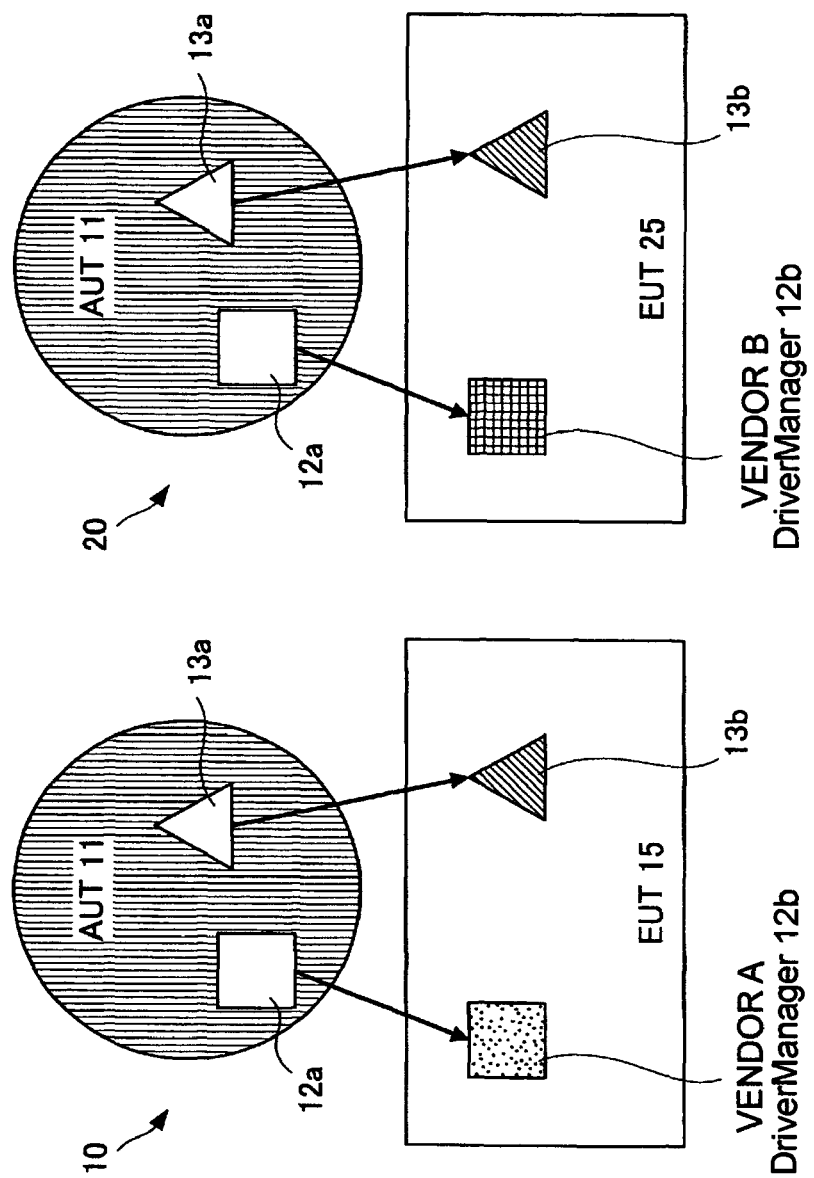
FIG. 2 is a diagram showing systems 10 and 20 implemented by the computer program under test according to the preferred embodiment of the present invention.

FIG. 2 shows systems 10 and 20 implemented by a computer program under test. As shown in FIG. 2, for example, an application issues a request for a DriverManager 12a to an execution environment in order to connect to a database. Then, a DriverManager 12b of a vendor A is injected into the application and used as a DriverManager in a certain execution environment, and a DriverManager 21b of a vendor B is injected into the application and used as a DriverManager in another execution environment. As in the case of the systems 10 and 20 shown in FIG. 2, the system configuration for an integration test can be readily changed simply by changing dependencies. That is, a DI container can switch from the system 10 to the system 20 simply by describing link information as "application→DriverManager of vendor A" for an EUT 15 and "application→DriverManager of vendor B" for an EUT 25.

An integration test is a test executed on all the execution environments that can be adopted by an AUT. When an AUT is tested, a test is executed by adopting one execution environment (EUT) that is used by an application under test. In an integration test, a test is executed exhaustively on all the execution environments (EUTs) that can be adopted as the execution environment (EUT). In the example shown in FIG. 2, an integration test includes testing for a case where the DriverManager 12b of the vendor A is dependency-injected into the application and testing for a case where the DriverManager 21b of the vendor B is dependency-injected into the application.

Figure 3:
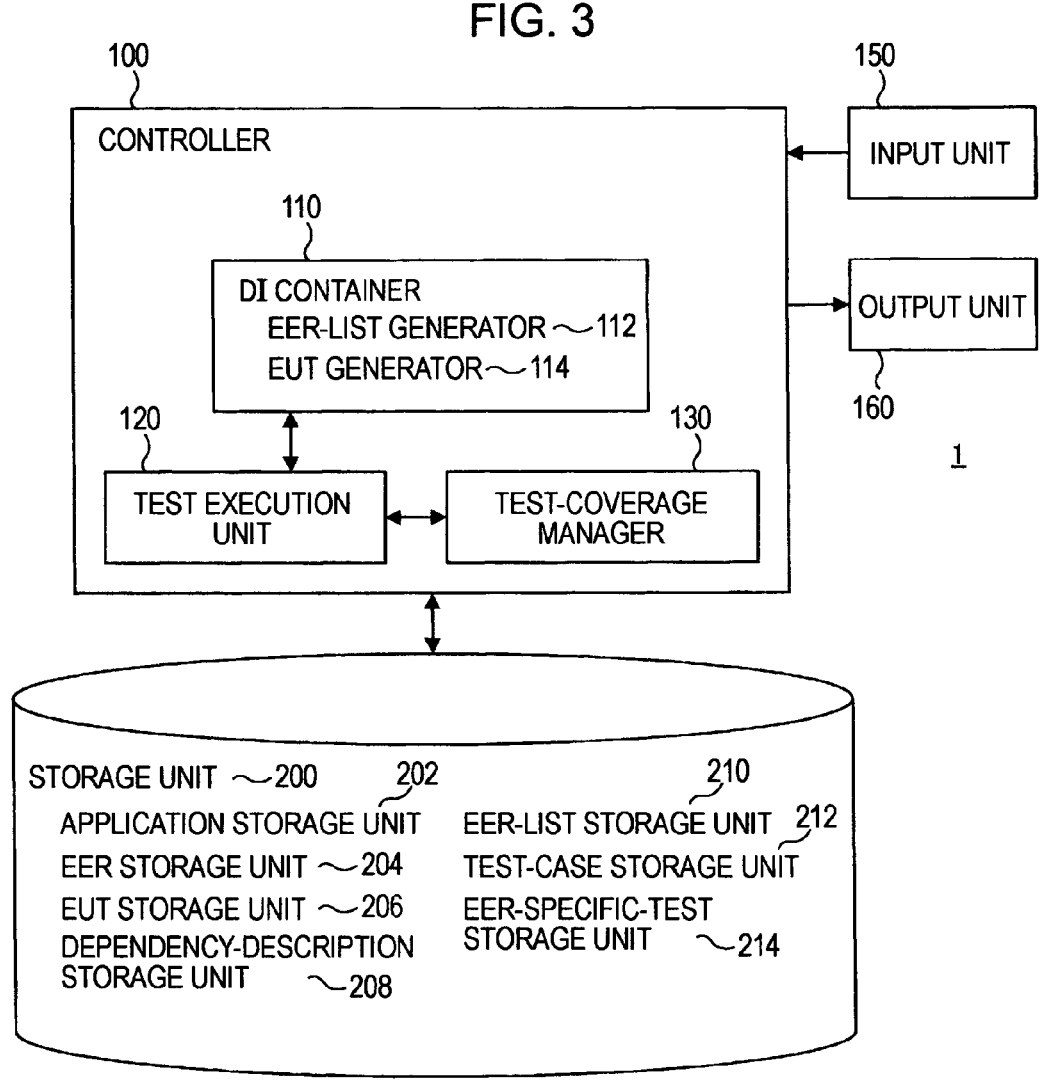
FIG. 3 is a functional block diagram of a testing device 1 according to the preferred embodiment of the present invention.

FIG. 3 is a functional block diagram of a testing device 1 for executing the integration test described above. The testing device 1 includes a controller 100 for calculating information and data and exercising control, an input unit 150 for accepting input of information and data, an output unit 160 for outputting information and data, and a storage unit 200 for storing information and data. The testing device 1 may be, for example, a computer. The testing device 1 may include a communication unit (not shown) that allows connection to a communication network and communication with external terminals connected to the communication network. When the testing device 1 includes a communication unit, without providing the input unit 150 and the output unit 160 in the testing device 1, information and data may be input by remote operations from an external terminal, and results of calculation and control by the controller 100 may be transmitted to the external terminal and displayed on an output unit of the external terminal.

In the embodiment described above with reference to FIG. 3, a DI container 110 is included in the controller 100. Alternatively, the configuration may be such that the controller 100 of the testing device 1 includes a test execution unit 120 and a test-coverage manager 130 and that the DI container 110 runs on another computer. That is, the DI container 110 may run on a server that is capable of exchanging information and data with the testing device 1.

The controller 100 includes a DI container 110 for resolving links for dependency injection, a test execution unit 120 for executing a test, and a test-coverage manager 130 for managing the coverage of an integration test. The controller 100 is, for example, a central processing unit (CPU). The controller 100 executes a main flow process, an EER-list generating process, an EUT generating process, an EUT converting process, a single-test executing process, an integration-test executing process, a dynamic-single-test executing process, and a dynamic-integration-test executing process, as will be described later.

The DI container 110 executes processing on EERs that are dependency-injected into an application and EERs that are dependency-injected into an EER that is further dependency-injected into an application. The DI container 110 resolves dependencies on the basis of link information such as a dependency description file described later. The DI container 110 includes an EER-list generator 112 for generating an EER list and an EUT generator 114 for generating an EUT that is tested.

The test execution unit 120 reads test cases and EER-specific tests and executes tests. The tests executed by the test execution unit 120 involve both test cases read and executed via an application interface and EER-specific tests. The EER-specific tests are tests that are specific to a single EER, which are executed in order to recognize the status of an EER under test. The test execution unit 120 may be included in the DI container 110. A test case in this specification may refer to a test case for an integration test or a test case for a test of one EUT (hereinafter referred to as a "single test").

The test-coverage manager 130 manages EUTs that have been tested through single tests and EUTs that have not yet been tested through single tests. The test-coverage manager 130 exercises control so that the test execution unit 120 executes tests on all the EUTs, thereby executing an integration test.

The storage unit 200 includes an application storage unit 202 for storing an application, an EER storage unit 204 for storing EERs, an EUT storage unit 206 for storing EUTs, a dependency-description storage unit 208 for storing a dependency description file, an EER-list storage unit 210 for storing EER lists, a test-case storage unit 212 for storing test cases, and an EER-specific-test storage unit 214. The storage unit 200 may be, for example, a memory or a hard disk. Various pieces of information and data are stored in the storage unit 200 under the control of the controller 100.

Figure 4:
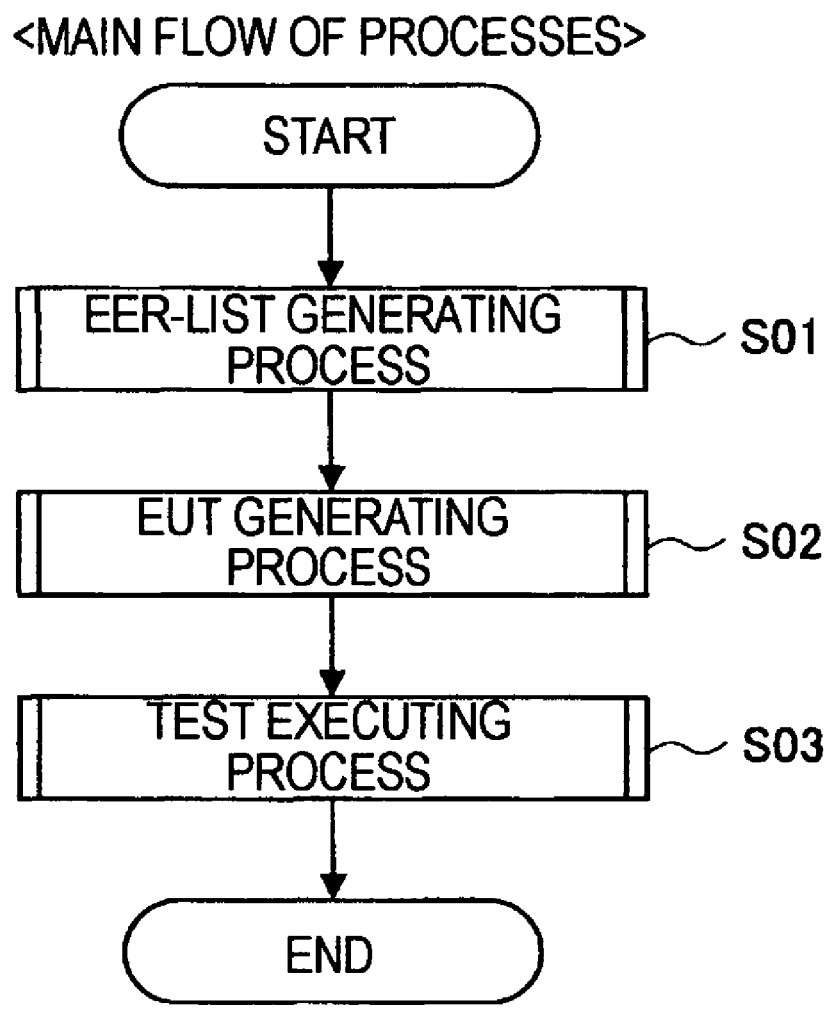
FIG. 4 is a flowchart of a main-flow process.

Now, the flow of a main process executed by the controller 100 will be described with reference to FIG. 4. The main-process flow relates to a method of executing a test through static resolution of dependencies. A "static test" herein refers to a test in which EUTs that are dependency-injected are listed before execution of the test. In contrast, in a "dynamic test", EUTs are not generated in advance before executing a test case, and when a test case is executed, EERs are listed in response to a request for EERs from an AUT to a DI container, and the EERs listed are injected and a test is executed, whereby all the EUTs that are to be injected in an integration test are tested.

Before executing a test through static resolution of dependencies, the EER-list generator 112 of the controller 100 executes an EER-list generating process (step S01). In the EER-list generating process, a plurality of EER lists is generated, each of the EER lists including two or more EERs that constitute alternatives among the EERs that are dependency-injected into the AUT, as will be described later with reference to FIG. 5.

Then, the EUT generator 114 executes a process of generating EUTs from the EER lists generated (step S02). That is, the EUT generator 114 generates EUTs by extracting EERs from the EER lists. Then, the test execution unit 120 executes tests on all the EUTs generated by the EUT generator 114, thereby executing an integration test (step S03). The processes in the method of static resolution of dependencies will be described below in detail.

Figure 6:
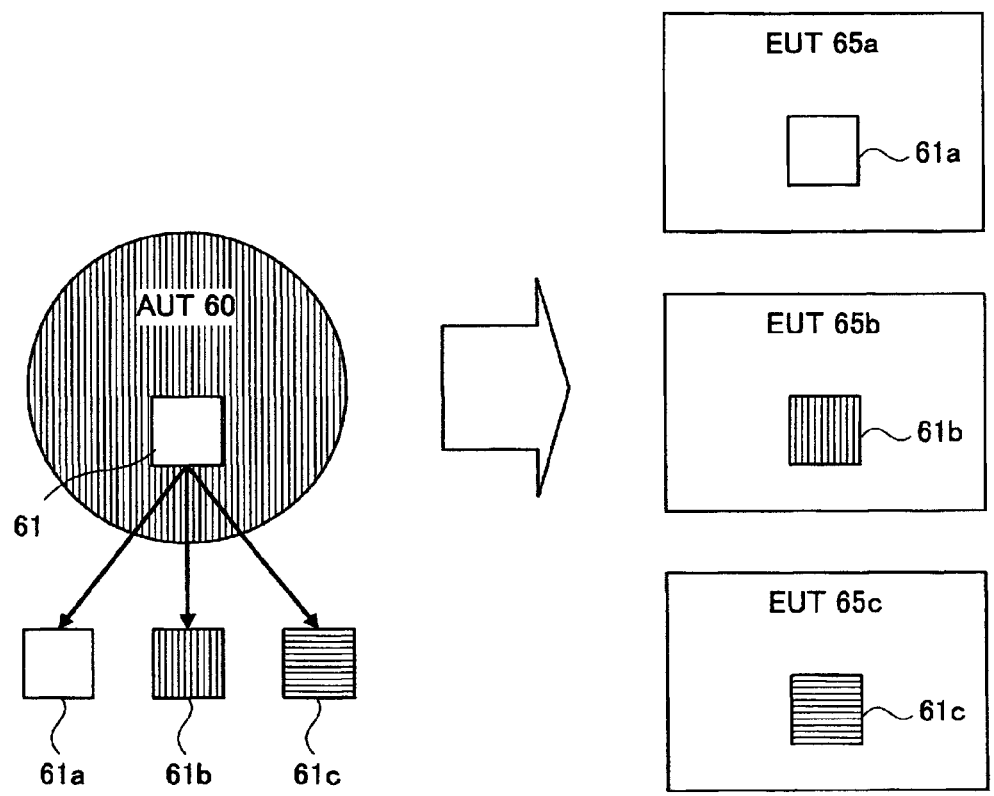
FIG. 6 is a diagram schematically showing EUTs that are dependency-injected into an AUT.

In order to describe an EER list, EUTs and EERs that are dependency-injected into an AUT that is tested will be described. FIG. 6 is a diagram schematically showing EUTs that are dependency-injected into an AUT. As shown in FIG. 6, an AUT 60 is tested with one of EERs 61a to 61c dependency-injected therein. That is, the EER 61a, EER 61b, and EER 61c are execution-environment modules that are injected alternatively. Thus, in order to execute an integration test on the AUT 60, a test must be executed on each of an EUT 65a including the EER 61a, an EUT 65b including the EER 61b, and an EUT 65c including the EER 61c.

Figure 7:
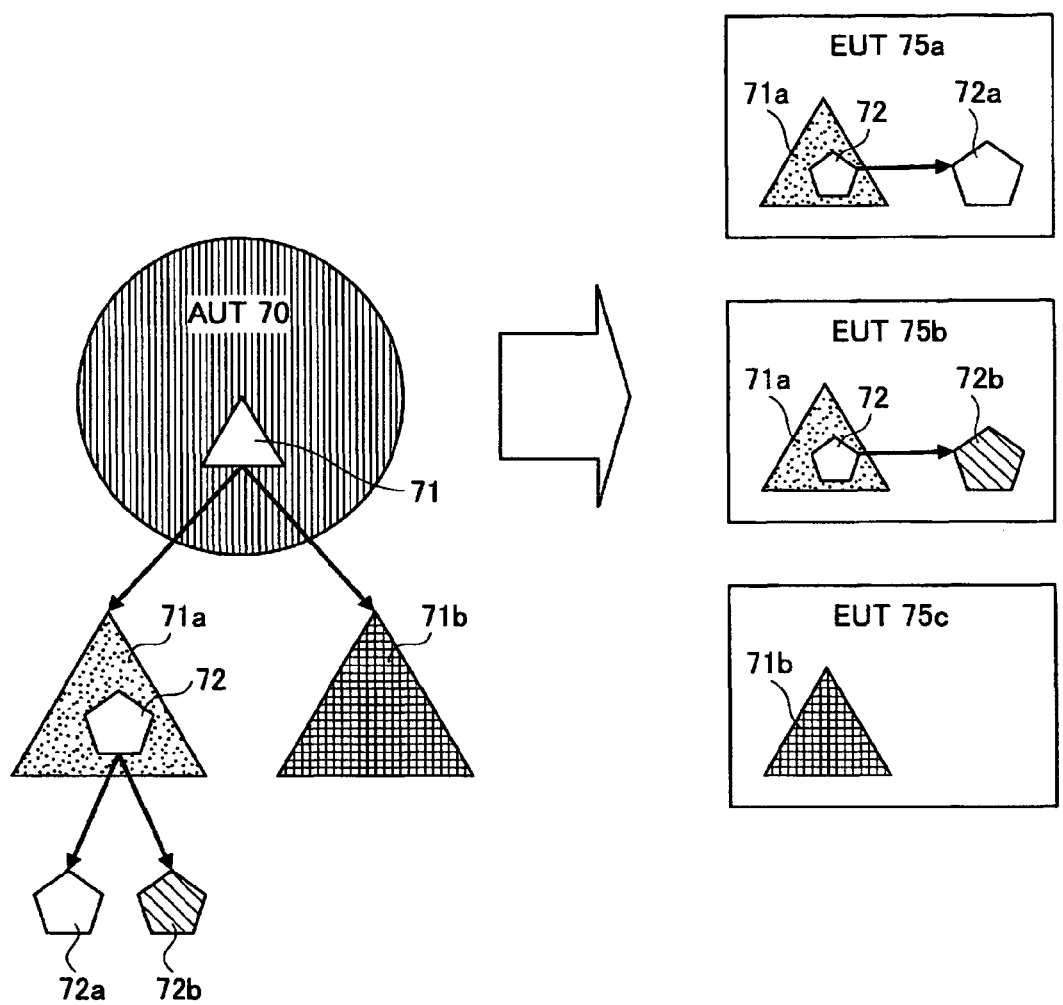
FIG. 7 is a diagram schematically showing EUTs that are dependency-injected into an AUT.

FIG. 7 is a diagram schematically showing EUTs that are dependency-injected into an AUT, similarly to FIG. 6. As shown in FIG. 7, an AUT 70 is tested with one of EERs 71a and 71b dependency-injected therein. In the EER 71a, an EER 72a or EER 72b is dependency-injected further. Thus, an integration test needed in this case involves combinations of EERs required in execution of a test of the AUT 70. In one case, as a combination, only the EER 71b is dependency-injected, whereby an EUT 75c is generated. In another case, the EER 72a is dependency-injected into the EER 71a and the EER 71a with the EER 72a having been dependency-injected therein is dependency-injected into the AUT 70, whereby an EUT 75b is generated. In yet another case, the EER 72b is dependency-injected into the EER 71a and the EER 71a with the EER 72b having been dependency-injected therein is dependency-injected into the AUT 70, whereby an EUT 75a is generated.

As described above, when an EER is dependency-injected into another EER, it is needed to list combinations of minimum EERs needed for the execution of a test on an AUT and to execute an integration test on all the EUTs listed.

An EER list includes a group of two or more EERs that constitute alternatives among EERs that are dependency-injected into an AUT in order to execute an integration test as described above, such as the EER 71a and EER 71b.

Figure 5:
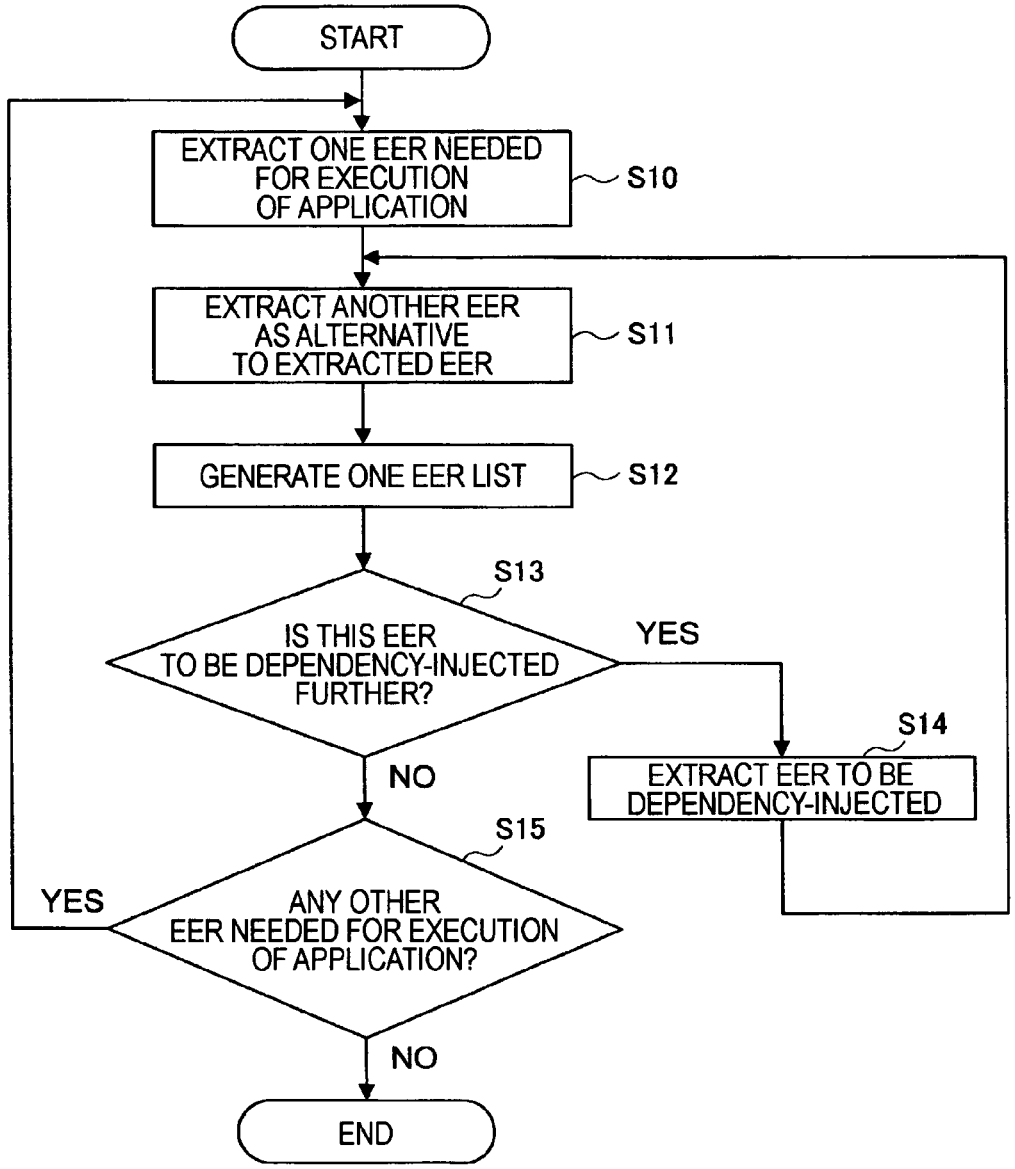
FIG. 5 is a flowchart of an EER-list generating process.

The EER-list generating process executed by the EER-list generator 112 will be described with reference to FIG. 5. The EER-list generator 112 extracts one EER needed for the execution of an application corresponding to an AUT (step S10). Then, the EER-list generator 112 extracts another EER that serves as an alternative to the EER extracted previously (step S11). Then, the EER-list generator 112 generates a single EER list using the one EER and the extracted EER (step S12).

FIG. 8 is a diagram schematically showing an EER list. As shown in FIG. 8, in order to execute an application, an EER 81 and an EER 82 are needed as EERs. EERs that are dependency-injected into an EER 81 are EERs 81a to 81c. The EERs 81a to 81c form an EER list 73a as alternative EERs.

Then, the EER-list generator 112 determines whether another EER is to be dependency-injected further (step S13). In the example shown in FIG. 8, since another EER is not dependency-injected into the EER 81, so that it is determined that another EER is not to be dependency-injected further, so that the process proceeds to step S15. In step S15, the EER-list generator 112 determines whether any other EER is needed for the execution of the application. Since the EER 82a or the EER 82b is to be dependency-injected into the EER 82 in order to execute the application, the process returns to step S10, and an EER list is created for an EER 82a (steps S11 and S12).

In the EER 82a, an EER 83a is dependency-injected for the execution of the application. Thus, the EER-list generator 112 determines that the EER 83a is dependency-injected into the EER 82a (step S13), and in step S14, the EER-list generator 112 extracts the EER 83a that is dependency-injected. After extracting the EER 83a, the EER-list generator 112 extracts another EER that serves as an alternative to the EER 83a (step S11), and generates an EER list 73c using the another EER that serves as an alternative to the EER 83a (step S12). Furthermore, when another EER is dependency-injected into the EER 83a, the EER-list generator 112 executes similar processing (processing in steps S11 and S12) on the EER that is dependency-injected.

Finally, the EER-list generator 112 determines that EERs other than the EER 81 and the EER 82 are not needed for the execution of the application (step S15). Then, the EER-list generating process is exited.

The EER lists generated by the EER-list generator 112 are stored in the EER-list storage unit 210.

In the EER-list generating process described above, step S10 is a step of extracting one EER needed for the execution of an application. When a dynamic test is executed, one EER needed for the execution of an AUT is extracted. That is, in this case, step S10 is "extraction of one EER needed for the execution of an AUT", and the EER-list generator 112 generates EER list while a test is executed.

Figure 9:
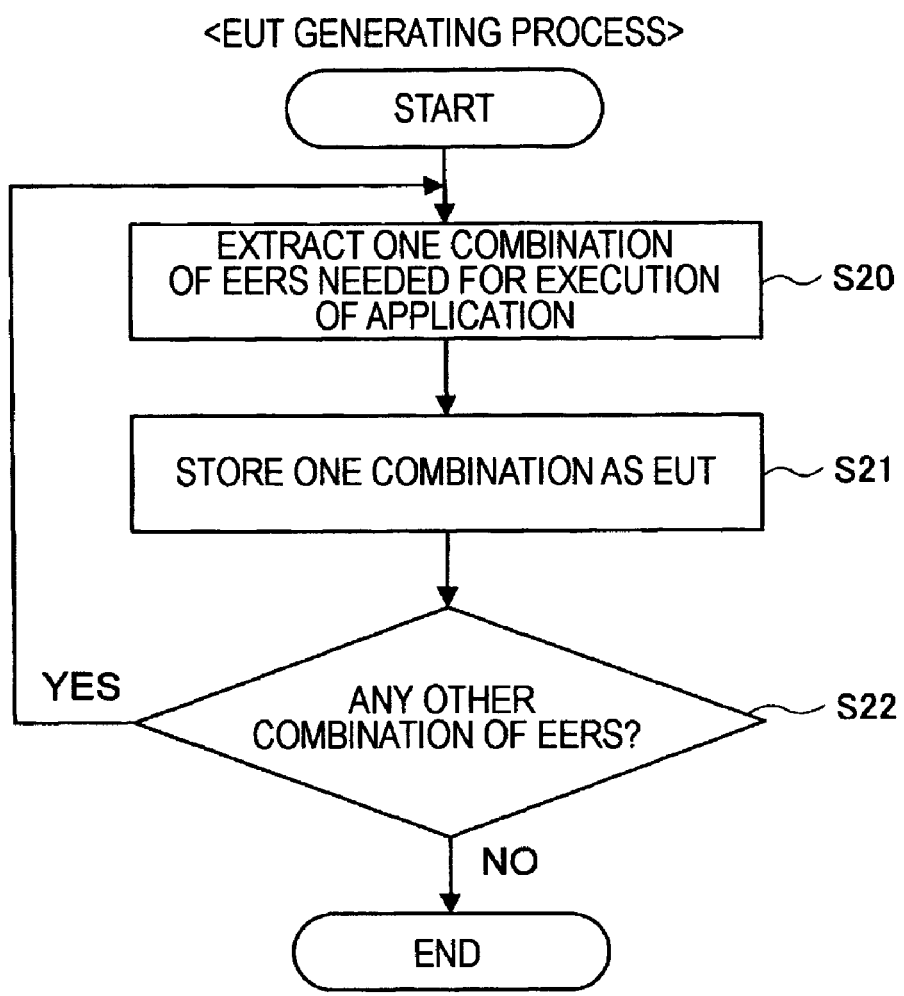
FIG. 9 is a flowchart of an EUT generating process.
Figure 10:
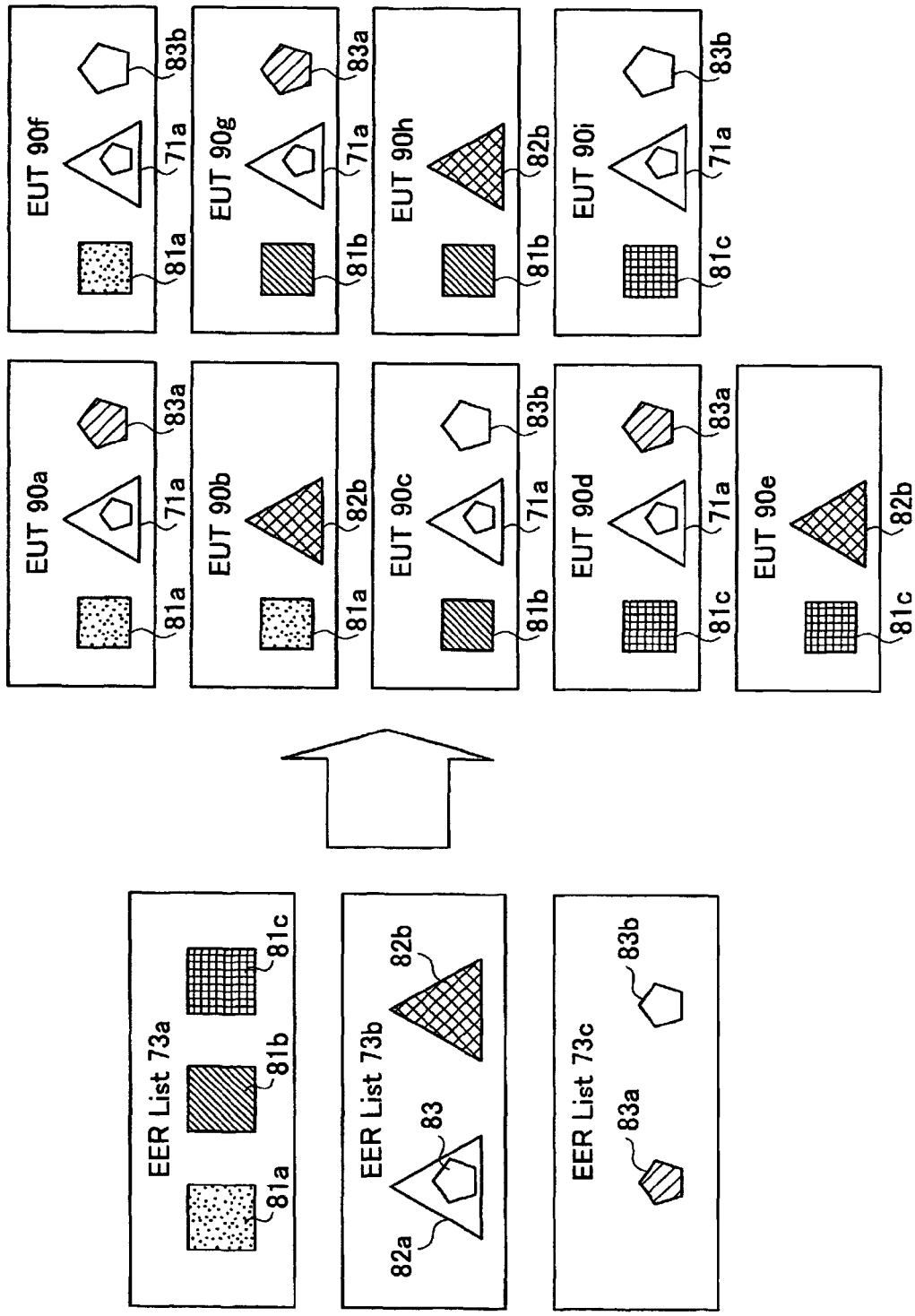
FIG. 10 is a diagram schematically showing generation of EUTs from EER lists.

FIG. 9 is a flowchart of the EUT generating process in a case where a static test is executed. The EUT generating process executed by the EUT generator 114 will be described with reference to FIGS. 9 and 10. FIG. 10 is a diagram schematically showing generation of EUTs from EER lists. As shown in FIG. 10, the EUT generator 114 generate EUTs 90a to 90i that serve as candidates of dependency injection into the application on the basis of the EER lists 73a to 73c generated by the EER-list generator 112.

The EUT generator 114 extracts one combination of EERs needed for the execution of the application (step S20). That is, the EUT generator 114 extracts one EER needed from one EER list, and executes this extraction from all the EER lists, thereby extracting one combination of EERs (step S20).

In the example shown in FIG. 10, in order to execute the application shown in FIG. 8 (corresponding to an AUT in the figure), the EER 81 and EER 82 must be dependency-injected as EERs. Thus, for example, the EUT generator 114 extracts one EER 81a from the EER list 73a and extracts the EER 82 from the EER list 73b, thereby generating one combination of EERs (EER 81a and EER 82).

The EUT generator 114 stores an EUT including the one combination of EERs in the EUT storage unit 206 (step S21). That is, the EUT generator 114 generates an EUT 90b including the one combination of EERs (EER 81a and EER 82). Then, the EUT generator 114 checks whether any other combination of EERs exists (step S22). In the example shown in FIG. 10, since other combinations of EERs exist, the process returns to step S20, and the EUT generator 114 generates an EUT for another combination of EERs.

That is, the EUT generator 114 executes similar processing on combinations of EERs (e.g., a combination of the EER 81b, EER 82a, and EER 83a, a combination of the EER 81c and EER 83b, etc.), thereby generating EUTs 90a to EUTs 90i.

In the EUT generating process described above, step S20 is a step of extracting one combination of EERs needed for the execution of an application. When a dynamic test is executed, EUTs are not generated, and one combination of EERs needed for the execution of an AUT is extracted from EER lists at the time of execution of a test.

Figure 11:
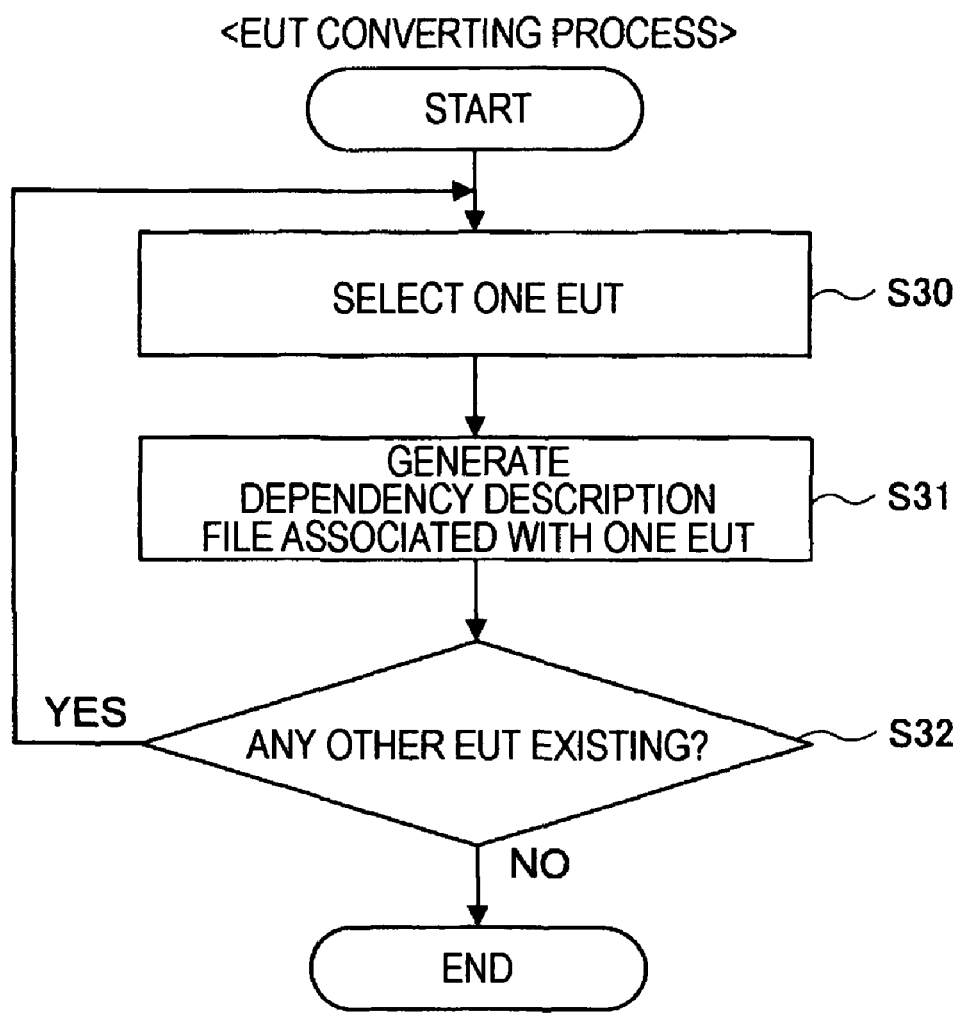
FIG. 11 is a flowchart of an EUT converting process.

Next, the EUT converting process will be described with reference to FIG. 11. The EUT generator 114 converts one EUT into a dependency description file.

The dependency description file is a description file including information regarding dependency links extracted from information described in an application (AUT) or execution-environment modules (EERs). The DI container 110 reads the dependency description file to resolve dependency injection into an application or an execution-environment module.

The EUT generator 114 selects one EUT generated (step S30), and generates a dependency description file corresponding to the one EUT (step S31). Then, the EUT generator 114 checks whether any other EUT exists, and when it is determined that another EUT exists, the process proceeds to step S30 (step S32).

Next, a test executing process in which the test execution unit 120 executes static tests will be described with reference to FIGS. 12 to 14. Dynamic tests executed by the test execution unit 120 will be described later with reference to FIGS. 15 and 16.

The test execution unit 120 executes tests individually on a plurality of EUTs generated by the EUT generator 114.

Figure 14:
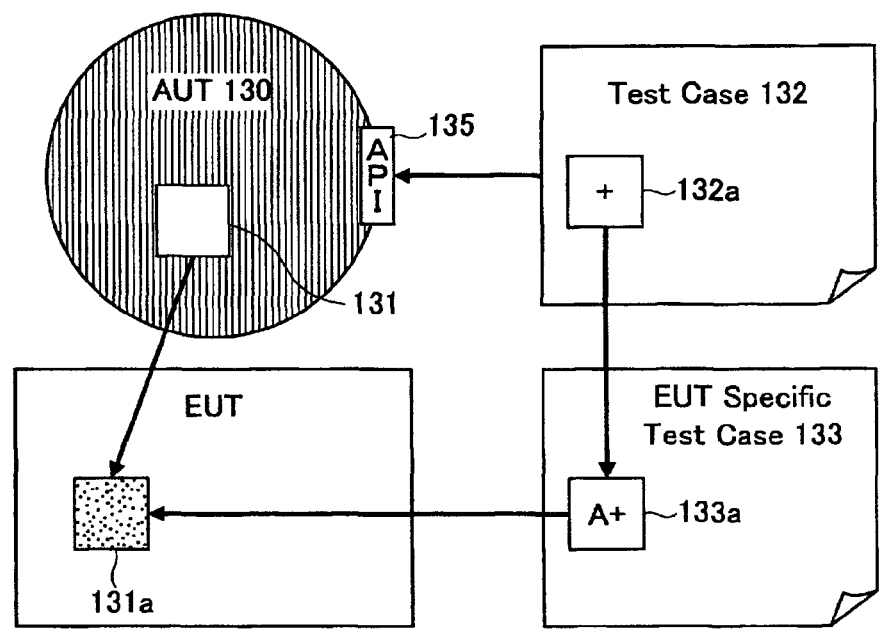
FIG. 14 is a diagram schematically showing a test executed on an AUT.

As shown in FIG. 14, the tests executed by the test execution unit 120 includes two tests; namely, a test in which a test case 132 is executed via an application interface and an EER-specific test 133 for a single EER. A test case is a program that is written for testing an AUT 130, and data is input and output via an application interface in the test.

An EER-specific test is a test needed for a single EER. For example, with the test case described above alone, in some cases, an output indicating no error as a final result for the test case can be output even when a person executing the test does not recognize the internal status of the EER. In such cases, the EER-specific test provides the person executing the test with the internal status of the EER during the operation of the test case. The EER-specific test is read out from the test case (readout of a method) at a certain timing during the execution of the test case and is then executed, whereby a result of testing for the EER is output.

The test case and the EER-specific test are stored in the test-case storage unit 212 and the EER-specific-test storage unit 214, respectively, before the execution of the tests.

Figure 12:
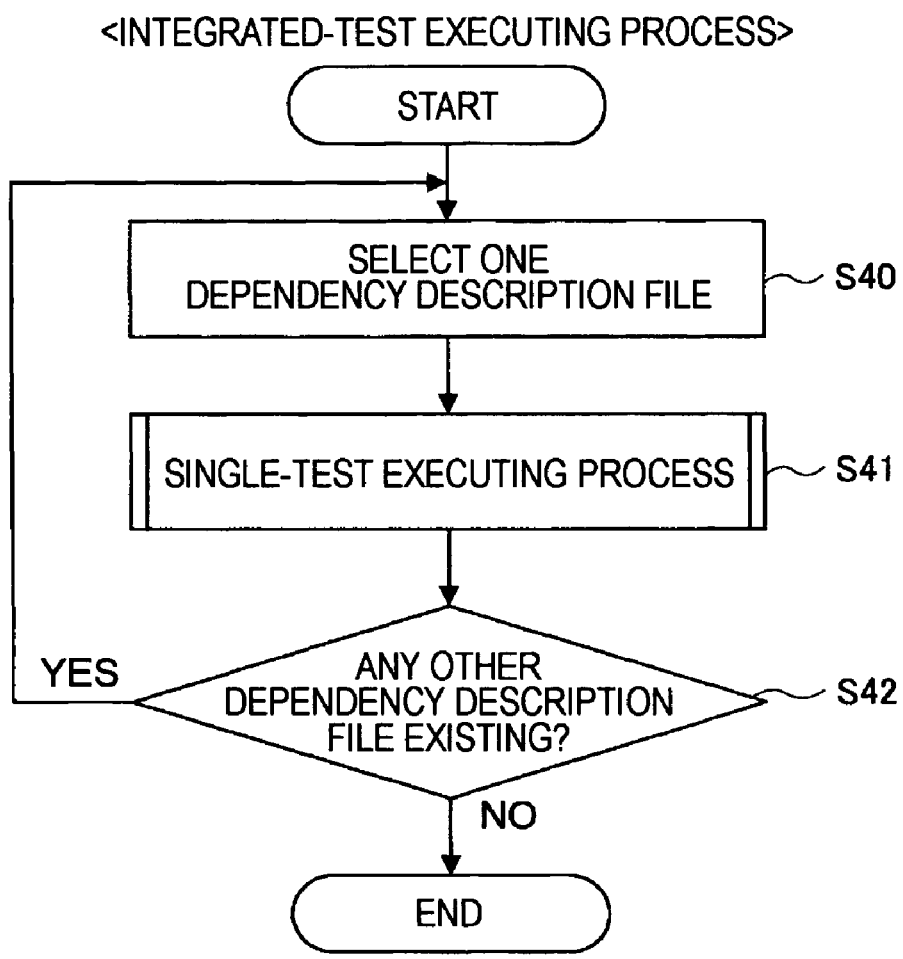
FIG. 12 is a flowchart of an integration-test executing process.

FIG. 12 is a flowchart of an integration-test executing process executed by the test execution unit 120. The test execution unit 120 selects one dependency description file (step S40). The one dependency description file corresponds to one EUT as described earlier. Thus, for example, the dependency description file corresponding to the EUT 90b shown in FIG. 10 includes link information between the application and the EER 81a and link information between the application and the EER 82b.

Then, on the basis of the dependency description file selected, the test execution unit 120 executes a single test for the EUT corresponding to the dependency description file (step S41). The single-test executing process will be described later with reference to FIG. 13. After finishing the single-test executing process, the test execution unit 120 checks whether any other dependency description file exists (step S42). When another dependency description file exists, the test execution unit 120 executes a single test for another dependency description file (step S41). When it is determined that another dependency description file does not exist (step S42), the test execution unit 120 finishes the integration test.

Figure 13:
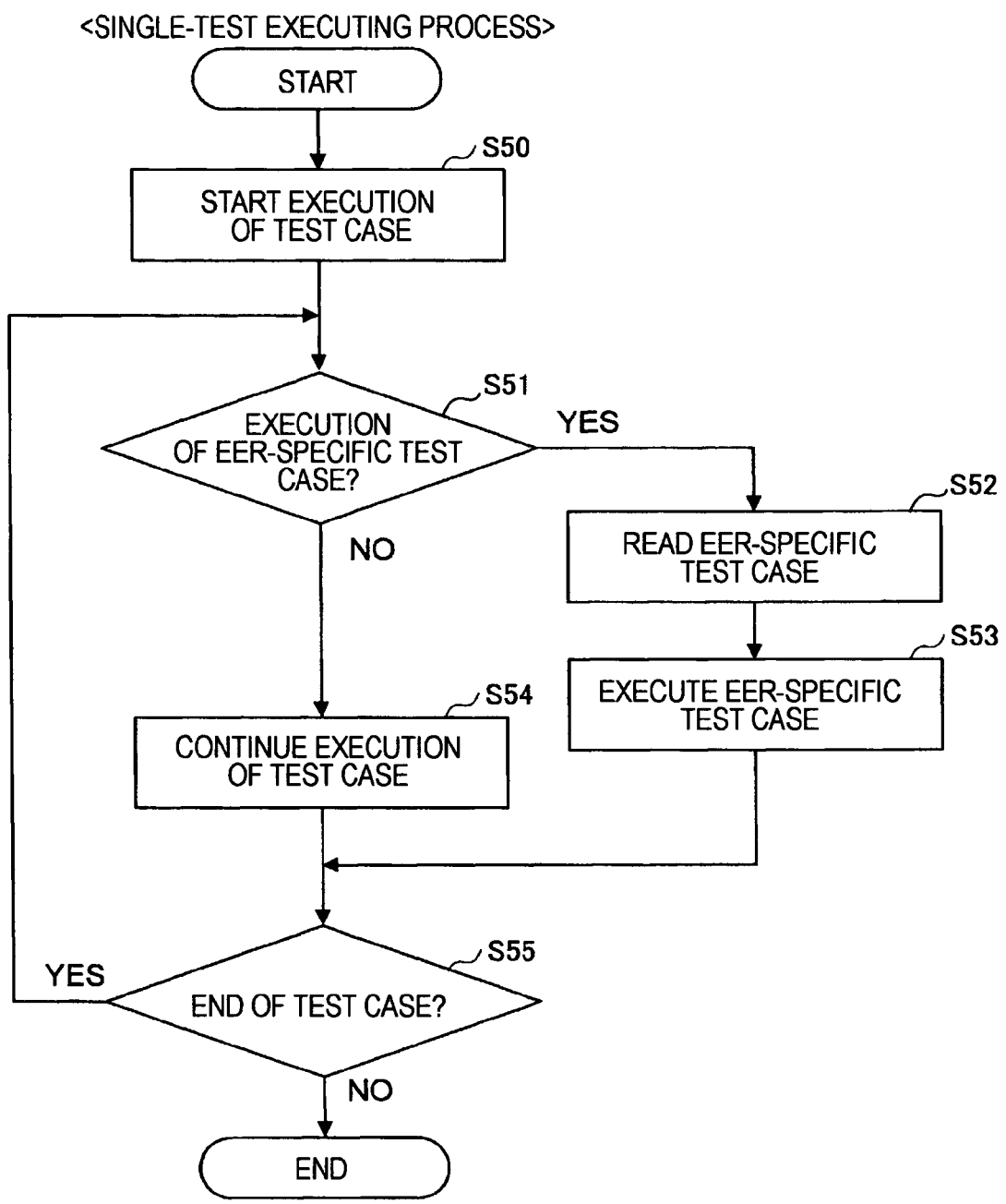
FIG. 13 is a flowchart of a single-test executing process.

FIG. 13 is a flowchart of a single-test executing process. The single-test executing process executed by the test execution unit 120 will be described with reference to FIGS. 13 and 14. FIG. 14 is a diagram schematically showing a case where a test is executed on an AUT. The test execution unit 120 starts execution of the test case 132 on the AUT 130 via an API (application interface) 135 (step S50). Then, the test execution unit 120 or the DI container 110 executes the test case by dependency-injecting one EER from the dependency description file for the single test.

Then, the test execution unit 120 checks whether an EER-specific test case is executed while executing the test case (step S51). When the test case to be executed is an ordinary test case, not an EER-specific test case, the test execution unit 120 continues execution of the test case (step S54). When an EER corresponding to an EER-specific test stored in the EER-specific-test storage unit 214 is dependency injected, the test execution unit 120 executes the EER-specific test case corresponding to the EER.

When it is determined that an EER-specific test case is executed while executing a test case, the test execution unit 120 reads (dependency-injects) a corresponding EER-specific test 133a from the EER-specific-test storage unit 214 (step S52) to execute an EER-specific test for an EER 131a (step S53). Then, the test execution unit 120 checks whether the test case has ended (step S54). When it is determined that the test case has not ended, the process returns to step S51.

When an EER is dependency-injected further into an EER that is dependency-injected into an AUT, the process may also return to step S51 so that an EER-specific test is executed on the EER that is dependency-injected into an EER. As described above, a test is executed by dependency-injecting EER-specific test corresponding to individual execution-environment modules, so that it is possible to test execution-environment modules as well as an AUT.

Figure 15:
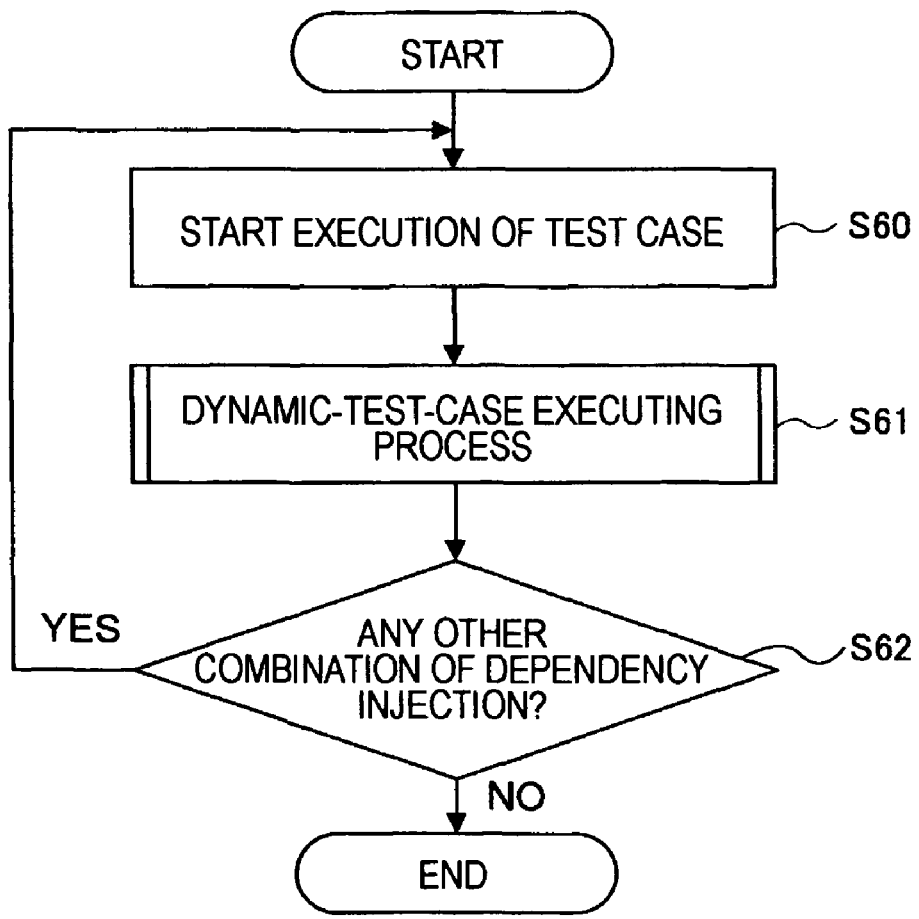
FIG. 15 is a flowchart of a dynamic-test executing process.
Figure 16:
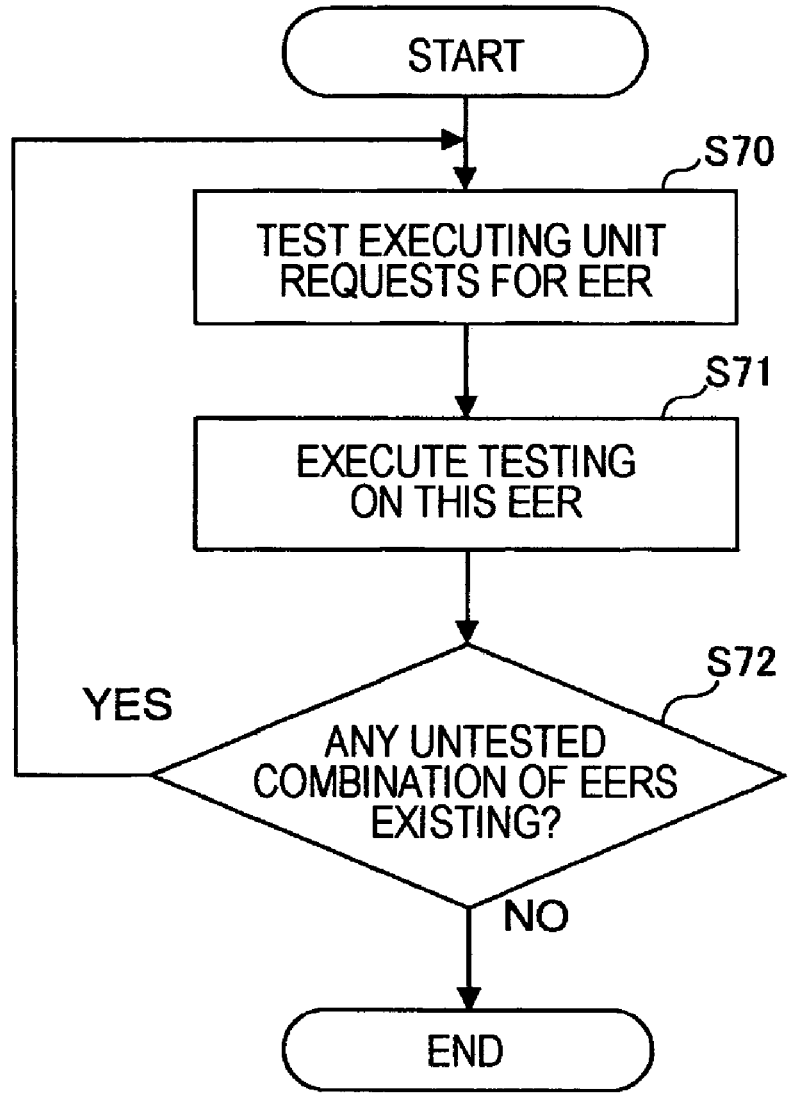
FIG. 16 is a flowchart of a dynamic-test-case executing process.

Next, a dynamic-test executing process will be described with reference to FIGS. 15 and 16. FIG. 15 shows a process in which a dynamic integration test is executed by the test execution unit 120. The test execution unit 120 starts execution of a test (step S60), and executes a dynamic-test-case executing process (step S61). Then, the test execution unit 120 checks whether any combination of EERs for which a test case has not yet been executed exists (step S62), thereby checking whether tests have been executed on all the EERs. The test execution unit 120 may consult the test-coverage manager 130 as to whether tests have been executed on all the EERs so that the test-coverage manager 130 determines a combination of EERs for which a test case has not yet been executed. For example, the test-coverage manager 130 may accept input of data regarding the number of times of execution of testing needed for combinations of EERs, combinations of EERs needed for testing, and so forth from a person executing the test, and determine an untested combination of EERs on the basis of the data.

The dynamic-test-case executing process will be described with reference to FIG. 16. The test execution unit 120 requests the DI container 110 to extract an EER from an EER list (step S70). Then, the test execution unit 120 executes a test for the EER provided by the DI container 110 in response to the request (step S71). The DI container 110 may extract an EER from an EER list and provide the EER to the test execution unit 120. Then, the test execution unit 120 determines an untested combination of EERs (step S72). For example, the test execution unit 120 determines an untested combination of EERs on the basis of an EER list. Alternatively, the test execution unit 120 may consult the test-coverage manager 130 as to whether test have been executed on all the EERs so that the test-coverage manager 130 determines a combination of EERs for which a test case has not yet been executed.

Now, an example of dependency description file used by a DI container is given below.

(List 1)

```
<beans>
    <bean id="child" class="Child">
        <property name="name">
            <value>child1</value>
        </property>
        <property name="no">
            <value>1</value>
        </property>
    </bean>
    <bean id="parent" class="Parent">
        <property name="child">
            <ref bean="child"/>
        </property>
        <property name="name">
```

-continued (List 1)

```
            <value>parent</value>
        </property>
    </bean>
</beans>
```

List 1 shows that a "parent" resource is dependent on a "child" resource. That is, "parent" can be executed by dependency-injecting "child". As described above, the description of <bean id="parent" class="Parent"> and <property name="child"> corresponds to link information for resolution of dependency injection.

(List 2)

```
<beans>
    <bean id="child">
    </bean>
    <bean id="parent" class="Parent">
        <property name="child">
            <ref bean="child"/>
        </property>
        <property name="name">
            <value>parent</value>
        </property>
    </bean>
</beans>
```

In List 2, a "parent" resource is defined similarly to List 1. However, a "child" resource is only declared and is not defined. The definition of the "child" resource is described as a separate file as in List 3. In List 3, EERs named "Child1", "Child2", and "Child3" are defined as alternatives of "child". In the respective EERs, test cases ("Child1SpecificTestCase", "Child2SpecificTestCase", and "Child2SpecificTestCase") that are dependent on the implementations of the EERs are defined.

(List 3)

```
<eer-list id="child">
    <bean class="Child1">
        <property name="name">
            <value>child1</value>
        </property>
        <property name="no">
            <value>1</value>
        </property>
        <testcase class="Child1SpecificTestCase"/>
    </bean>
    <bean class="Child2">
        <property name="name">
            <value>child2</value>
        </property>
        <property name="no">
            <value>1</value>
        </property>
        <testcase class="Child2SpecificTestCase"/>
    </bean>
    <bean class="Child3">
        <property name="name">
            <value>child3</value>
        </property>
        <property name="no">
            <value>1</value>
        </property>
        <testcase class="Child3SpecificTestCase"/>
    </bean>
</eer-list>
```

Lastly, an example where the testing method according to the embodiment described above is applied to a bank system will be described. Referring to FIG. 17, an application corresponding to an AUT is a bank system 300, and execution-environment modules that are dependency-injected into the bank system 300 are a database 301 and a messaging function 302. Regarding the database 301, an integration test of execution environments of a database 301a of a vendor A, a database 301b of a vendor B, and a database 301c of a vendor C is needed in relation to the bank system 300. Also, regarding the messaging function 302, an integration test of execution environments of a cellular-phone function 302a and an E-mail 302b is needed in relation to the banking system 300. The cellular-phone function 302a refers to a module having a function of sending a message using a cellular phone. The E-mail 302b refers to a module having a function of sending a message using an E-mail. Furthermore, regarding the cellular-phone function 302a, an integration test with a module for a network 303a of Y Corporation and a module for a network 303b of Z Corporation is needed.

Test cases 1 to 3 are executed via an application interface 305. For example, the test case 1 is a test for "opening an account" in the bank system, the test case 2 is a test for "depositing money" in the bank system, and the test case 3 is a test for "withdrawing money" in the bank system.

The bank system 300 accepts requests for execution of "opening an account (an account number is specified)", "depositing money (an account number and a sum are specified)", and "withdrawing money (an account number and a sum are specified)" from an external program. When these processes are executed using the database 301 connected to the bank system 300. Furthermore, when the processes are finished, messages indicating completion of the processes are sent to the user. As function requirements of the banking system, dependency-injection of the following EERs must be allowed:

(1) Execution of the databases of the vendors A, B, and C is allowed as the database.
(2) Execution of the cellular-phone messaging function and the E-mail messaging function is allowed as the messaging function.
(3) Execution of messaging functions for the networks of Y Corporation and Z Corporation is allowed as the cellular-phone messaging function.

The test is executed on these systems.

(1) The processes and executed, and it is checked whether the processes are reflected on the database. This is done by checking whether values are properly input in a specific record of a specific table of the database.
(2) The processes are executed, and it is checked whether the messaging functions are working properly. This is done by checking methods specific to individual messaging components (specific tests).

(Test case: Opening an account of John)
Program executed, system, part: command (variable)
Bank system: Opening an account ("John")
DI container: Obtain components ("bank system", "database")
Database component: Confirmation of account registration ("John")
DI container: Obtain components ("bank system", "messaging")
DI container: Obtain component test case (messaging component, "confirmation of registration message")
Component for confirmation of registration message: Execute ("John")

When the test case written as described above is executed, for example, a test for confirming an account registration message of the cellular-phone function 302a that is dependency-injected is needed. As specific tests that are dependency-injected, in FIG. 17, an account-registration-message confirmation 310a for the cellular phone, an account-registration-message confirmation 320a for the network of Y Corporation, and an account-registration-message confirmation 320b for the network of Z Corporation are shown. Examples of specific tests for these EERs are given below.

(Test case: Cellular-phone account-registration-message confirmation)
(1) DI container: Obtain components ("cellular-phone account-registration-message component", "type")
(2) Type component: Execute (account name)

(Test case: E-mail account-registration-message confirmation)
Check the presence or absence of an account-registration confirmation mail in a sent E-mail list (account name)

(Test case: Y-Corporation's-network account-registration-message confirmation)
Check the presence or absence of an account-registration confirmation mail in a sent list for the Y Corporation's network (account name)

(Test case: Z-Corporation's-network account-registration-message confirmation)
Check the presence or absence of an account-registration confirmation mail in a sent list for the Z Corporation's network (account name)

By using the method and system according to the embodiment described above, it is possible to automate an integration test of an application supporting different system configurations. Furthermore, with the feature of a DI container that setting of dependencies or a list of supported dependencies that has once been created can be managed separately from an application, reusability of information needed for testing is improved. Furthermore, by achieving automation of an integration test of an application, various advantages can be achieved, such as earlier discovery of bugs, improved efficiency of debugging, maintenance of test reports, simplified execution of tests, improved productivity of testers, reduction of human errors in testing, and saving of testing methods. Hitherto, proposals for automation of tests have been directed mainly to tests of logics of applications. According to the present invention, advantages of automation can also be achieved for the construction of test execution environments. The setting of dependencies and the list of supported dependencies used in the embodiment described above can not only be applied to a single application but can also be applied to various other applications. For example, when two applications use the same container, it is possible to share setting of dependencies and a list of supported dependencies for the container. In view of the current situation where reusability of developed products such as assets is desired, the chance of using the same container is presumably high, so that the reuse of information needed for testing of such products is highly effective.

Although the present invention has been described in the context of an embodiment and example, the technical scope of the present invention is not limited to the embodiment described above. It is possible to modify or improve the embodiment in various manners, and it is to be understood from the claims that the modified or improved techniques fall within the technical scope of the present invention.

The method of testing a program, described above as an embodiment of the present invention, can be implemented by a computer system or a program for allowing a computer to execute the functions of the computer system. The program may be stored on a recording medium, such as an electronic, magnetic, optical, magneto-optical, infrared, or semiconductor system (or device or apparatus). Examples of computer-readable media include semiconductor or solid-state storage device and magnetic tape. Examples of removable computer-readable media include semiconductor or solid-state storage device, magnetic tape, removable computer diskette, random access memory (RAM), read-only memory (ROM), rigid magnetic disk, and optical disk. Examples of optical disks currently available include compact disk read-only memory (CD-ROM), compact disk read/write (CD-R/W), and digital versatile disk (DVD).

The invention claimed is:

1. A method of testing a system configured for an application and a set of execution-environment-dependent resources used by the application, the method comprising the steps of:
   injecting at least one set of execution-environment-dependent resources into an application for which a test is executed via an application interface, the at least one set of execution-environment-dependent resources being a candidate of dependency injection into the application and used by the application; and
   executing a test on the application with the at least one set of execution-environment-dependent resources used by the application having been injected therein.

2. A method of testing a system configured for an application and a set of execution-environment-dependent resources used by the application, the method comprising the steps of:
   injecting one set of resources into an application for which a test is executed via an application interface, the one set of resources being a candidate of dependency injection into the application;
   executing a test on the application with the one set of resources having been injected therein;
   determining if any other set of resources exists that is different from the one set of resources; and
   repeating the injecting step and the test execution step on each other set of resources that is different from the one set of resources.

3. A method of testing a system configured for an application and a set of execution-environment-dependent resources used by the application, the method comprising the steps of:
   generating one or more sets of resources that serve as candidates of dependency injection into an application for which a test is executed via an application interface;
   injecting one set of resources into the application among the one or more sets of resources generated in the generating step;
   executing a test on the application with the one set of resources having been injected therein;
   determining if there is any other set of resources different from the one set of resources; and
   repeating the injecting step and the test execution step on each other set of resources that is different from the one set of resources.

4. The method according to claim 3, wherein the injecting step and the test execution step are executed on all the one or more sets of resources generated in the generating step.

5. The method according to claim 3,
   wherein the set of resources includes one or more execution environment modules, and
   wherein one or more sets of resources are injected into the application in the injecting step by injecting the one or more execution environment modules into the application.

6. The method according to claim 5,
   wherein the execution environment module includes one or more other execution environment modules, and wherein one or more sets of resources are injected into the application in the injecting step by injecting the one or more other execution environment modules into the execution environment module and injecting into the application the execution environment module with the one or more other execution environment modules having been injected therein.

7. The method according to claim 5, wherein the set of resources include two or more execution environment modules, and
wherein the set of resources is generated in the generating step by combining the two or more execution-environment modules.

8. The method according to claim 5, wherein, in the test execution step, a test is executed on the application with the set of resources having been injected therein, using a test case that is executed via an application interface.

9. The method according to claim 8, wherein the test execution step includes a step of providing the one or more other execution environment modules further injected into the execution environment module to the test case.

10. The method according to claim 5, further comprising a step of executing a test for the execution environment module.

11. The method according to claim 10, wherein, in the step of executing a test for the execution environment module, a test is selected and executed in accordance with the execution environment module injected into the application.

12. A testing device for testing a system configured of an application and a set of execution-environment-dependent resources used by the application, the testing device comprising:
a dependency injection, DI, container that injects one set of execution-environment-dependent resources into an application for which a test is executed via an application interface, the one set of execution-environment-dependent resources being a candidate of dependency injection into the application and used by the application; and
a test execution unit that executes a test on the application with the one set of execution-environment-dependent resources having been injected therein;
wherein the injection by the DI container and the test by the test execution unit are executed on each other set of resources, if any exists, that is different from the one set of resources.

13. A testing device for testing a system configured of an application and a set of execution-environment-dependent resources used by the application, the testing device comprising:
an execution-environment generator that generates one or more sets of resources that serve as candidates of dependency injection into an application for which a test is executed via an application interface;
a dependency injection, DI, container that injects one set of resources into the application among the one or more sets of resources generated by the execution-environment generator; and
a test execution unit that executes a test on the application with the one set of resources having been injected therein;
wherein the injection by the DI container and the test by the test execution unit are executed on each other set of resources, if any exists, that is different from the one set of resources.

14. A non-transitory computer storage device storing a computer program product for testing a system configured of an application and a set of execution-environment-dependent resources used by the application, the computer program product allowing a computer to execute a method comprising the steps of:
injecting one set of resources into an application for which a test is executed via an application interface, the one set of resources being a candidate of dependency injection into the application;
executing a test on the application with the one set of resources having been injected therein;
determining if at least one other set of resources exists that is different from the one set of resources; and
repeating the injecting step and the test execution step on each other set of resources that is different from the one set of resources.

15. A non-transitory computer storage device storing a computer program product for testing a system configured of an application and a set of execution-environment-dependent resources used by the application, the computer program product allowing a computer to execute a method comprising the steps of:
generating one or more sets of resources that serve as candidates of dependency injection into an application for which a test is executed via an application interface;
injecting one set of resources into the application among the one or more sets of resources generated in the generating step;
executing a test on the application with the one set of resources having been injected therein;
determining if at least one other set of resources exists that is different from the one set of resources; and
repeating the injecting step and the test execution step on each other set of resources that is different from the one set of resources.

16. The computer storage device according to claim 15, wherein the injecting step and the test execution step are executed on all the one or more sets of resources generated in the generating step.

17. The computer storage device according to claim 15, wherein the set of resources includes one or more execution environment modules, and
wherein one or more sets of resources are injected into the application in the injecting step by injecting the one or more execution environment modules into the application.

18. The computer storage device according to claim 17, wherein the execution environment module includes one or more other execution environment modules, and
wherein one or more sets of resources are injected into the application in the injecting step by injecting the one or more other execution environment modules into the execution environment module and injecting into the application the execution environment module with the one or more other execution environment modules having been injected therein.

19. The computer storage device according to claim 17, wherein the set of resources include two or more execution environment modules, and
wherein the set of resources is generated in the generating step by combining the two or more execution-environment modules.

20. The computer storage device according to claim 14, wherein, in the test execution step, a test is executed on the application with the set of resources having been injected therein, using a test case that is executed via an application interface.

* * * * *